United States Patent [19]

Yap

[11] Patent Number: 5,516,279
[45] Date of Patent: May 14, 1996

[54] OXY-FUEL BURNER SYSTEM DESIGNED FOR ALTERNATE FUEL USAGE

[75] Inventor: Loo T. Yap, Princeton, N.J.

[73] Assignee: The BOC Group, Inc., New Providence, N.J.

[21] Appl. No.: 271,309

[22] Filed: Jul. 6, 1994

[51] Int. Cl.⁶ .................................................. F23C 5/28
[52] U.S. Cl. ........................ 431/175; 431/278; 431/159
[58] Field of Search ...................... 431/8, 9, 10, 159, 431/175, 278, 190; 239/423, 424, 424.5, 429, 553.5, 554, 556, 566, 590.5, 597, 418

[56] References Cited

U.S. PATENT DOCUMENTS

| | | | |
|---|---|---|---|
| 4,927,357 | 5/1990 | Yap | 431/10 |
| 5,299,929 | 4/1994 | Yap | 431/10 |
| 5,383,782 | 1/1995 | Yap | 431/159 |

FOREIGN PATENT DOCUMENTS

| | | | |
|---|---|---|---|
| 2223631 | 11/1973 | Germany | 431/175 |
| 24706 | 2/1983 | Japan | 431/175 |

*Primary Examiner*—James C. Yeung
*Attorney, Agent, or Firm*—David M. Rosenblum; Larry R. Cassett

[57] ABSTRACT

An oxy-fuel burner system for alternately or simultaneously burning gaseous and liquid fuels. A gaseous fuel jet emanating from an oxy-fuel burner is either undershot by an oxygen lance or is sandwiched between oxidant jets produced by two subsidiary oxidant jets which are preferably formed of oxygen. An actuable second fuel nozzle is provided for producing a second fuel jet composed of the liquid fuel which is angled toward the oxidant jet at an angle of less than 20°. When the liquid fuel to be used, the gaseous fuel is turned off and the liquid fuel is turned on and vice-versa or both can operate simultaneously where the oxidant supplies oxygen to both fuel streams.

16 Claims, 3 Drawing Sheets

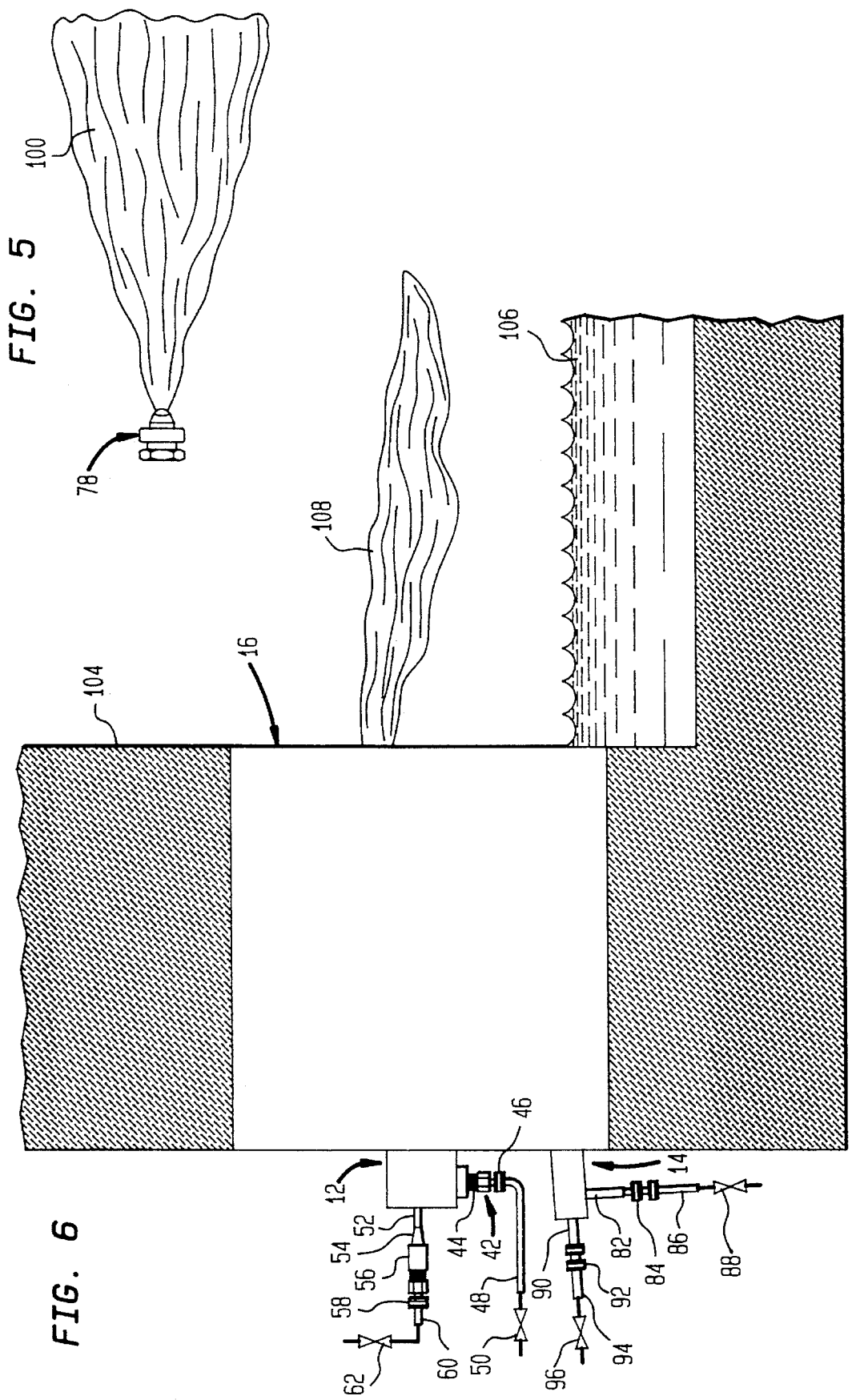

OXY-FUEL BURNER SYSTEM DESIGNED FOR ALTERNATE FUEL USAGE

BACKGROUND OF THE INVENTION

The present invention relates to an oxy-fuel burner system for alternately or possibly simultaneously burning gaseous and liquid fuels in the presence of oxygen or oxygen enriched air. More particularly, the present invention relates to such an oxy-fuel burner system having fuel and oxidant nozzles designed to project gaseous and liquid fuel jets and one or more oxidant jets so that either gaseous or liquid fuels can be burned with combustion supported by the oxidant.

Burners are used to heat a variety of melts such as glass, ferrous and non-ferrous metals and etc. A recent burner development concerns the use of oxygen or oxygen enriched air to support combustion of a fuel in a burner known as an oxy-fuel burner. Such burners are compact and produce typically small flames with a high power output.

The disadvantage of the high power output produced by the compact flames produced by the oxy-fuel burners is that hot spots may develop in the melt because of excessive localized heat-transfer rates. In order to prevent this, burners have been developed in which combustion is carried out over a wide area. For example, in U.S. Pat. No. 5,199,867 an outwardly divergent fan-shaped fuel jet is sandwiched between two similarly shaped oxidant jets. The lower oxidant jet is designed to produce a low pressure field to influence the fuel jet and thereby spread the combustion out over a wide area. Alternately, as illustrated in U.S. Pat. No. 5,299,929 the fuel jet can be designed to produce a low pressure field to influence the oxidant jets. In the former case the fuel is aspirated into the oxidant and in the latter case, the oxidant is aspirated into the fuel. In another type of oxy-fuel burner or burner system, shown in U.S. Pat. No. 4,927,357 a divergent fan-shaped oxidant jet is located below a burner or fuel jet to produce a low pressure field to attract the fuel jet and thereby position the flame downwardly, towards the melt. The methodology involved is known in the art as oxygen lancing.

Any of the foregoing burners or systems are optimized to operate with a specific type of fuel, either a gaseous or a liquid fuel. Very often though, the cost of the fuel varies in dependence upon the time of the year or sometimes even the time of day in which the fuel is used. The cost of ensuring availability of gaseous fuels during periods of peak demand ("non-interruptable rates") can be sufficiently significant that it becomes cost effective to shut down the furnace and replace the fuel nozzle used for the gaseous fuel with a fuel nozzle that is for a liquid fuel. As can be appreciated, though perhaps cost effective, the shut-down is an expensive production delay.

As will be discussed the present invention provides an oxy-fuel burner system that is designed to accommodate either liquid or gaseous fuel or both with a very rapid turnaround time when switching between the fuels.

SUMMARY OF THE INVENTION

The present invention provides an oxy-fuel burner system for alternately or simultaneously burning gaseous and liquid fuels. The oxy-fuel burner system includes an oxy-fuel burner including an actuable first fuel nozzle means for producing a first fuel jet composed of a main fuel and an oxidant nozzle means for producing at least one oxidant jet composed of an oxidant to support combustion of the main fuel of the first fuel jet. An actuable auxiliary second fuel nozzle means is provided for producing a second fuel jet composed of an auxiliary fuel to burn within the oxidant. The main and the auxiliary fuels are respectively composed of the gaseous and liquid fuels or vice versa. The oxy-fuel burner and the actuable auxiliary, second fuel nozzle means are configured such that, under normal operating conditions, the first and second fuel jets each have a momentum different than that of the at least one oxidant jet to cause mixing of the main and auxiliary fuels with the oxidant.

In accordance with another aspect of the present invention, an oxy-fuel burner system is provided for alternately burning gaseous and liquid fuels. The burner system comprises an oxy-fuel burner and actuable auxiliary, second fuel nozzle means. The oxy-fuel burner includes an actuable first fuel nozzle means for producing a first fuel jet composed of a main fuel, an oxidant nozzle means for producing two subsidiary oxidant jets composed of an oxidant, sandwiching the first fuel jet when the first fuel nozzle means is actuated to produce allow of said main fuel and merging into a combined oxidant jet when the first fuel nozzle means is actuated to at least reduce said flow of the main fuel. The second fuel nozzle means produce a second fuel jet composed of an auxiliary fuel to burn within the oxidant when the actuable, first fuel nozzle means is actuated to at least reduce flow of the main fuel. The main and the auxiliary fuels respectively are composed of the gaseous and liquid fuels or vice versa. The oxy-fuel burner and the actuable auxiliary, second fuel nozzle means are configured such that, under normal operating conditions, first and second fuel jets each have a momentum, in case of the first fuel jet, different from that of at least one of the two subsidiary oxidant jets and, in case of the second fuel jet, different from that of the combined oxidant jet to cause mixing of the main and auxiliary fuels with the oxidant.

In accordance with the present invention, the alternate burning of liquid and gaseous fuels from separate and distinct nozzles permits the fuel usage to be rapidly turned around within the burner system or even permits both fuels to be used in a combined fashion. It is to be noted that the term "actuable" as used herein and in the claims means that the applicable fuel or oxidant jet can be turned on or off at will and/or in addition, be proportionally adjusted between full off and on conditions of flow.

BRIEF DESCRIPTION OF THE DRAWINGS

While the specification concludes with claims distinctly pointing out the subject matter that Applicant regards as his invention, it is believed that the invention will be better understood when taken in connection with the accompanying drawings in which:

FIG. 5 is a top plan view of the outwardly divergent, fan-shaped jet developed by the fuel or oxidant jets of the present invention; and FIG. 6 is a fragmentary view of a furnace utilizing an oxy-fuel burner system of the present invention heating a melt.

DETAILED DESCRIPTION

Figure 2:
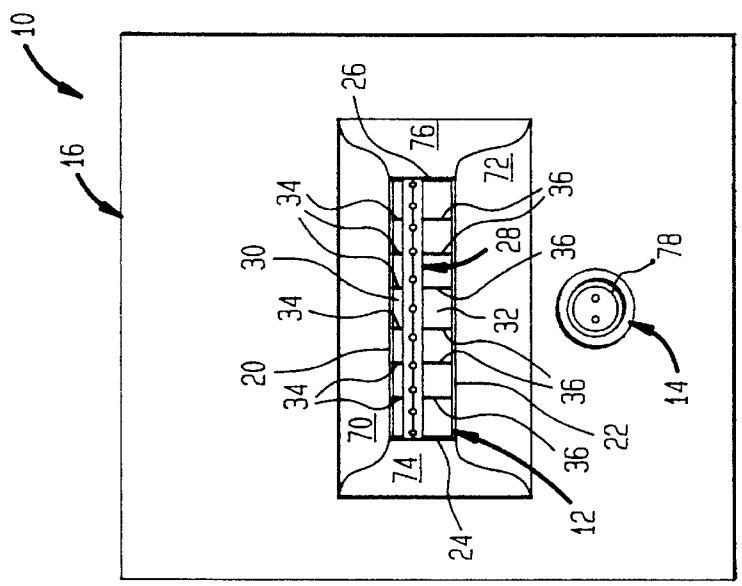
FIG. 2 is a front view of FIG. 1.
Figure 1:
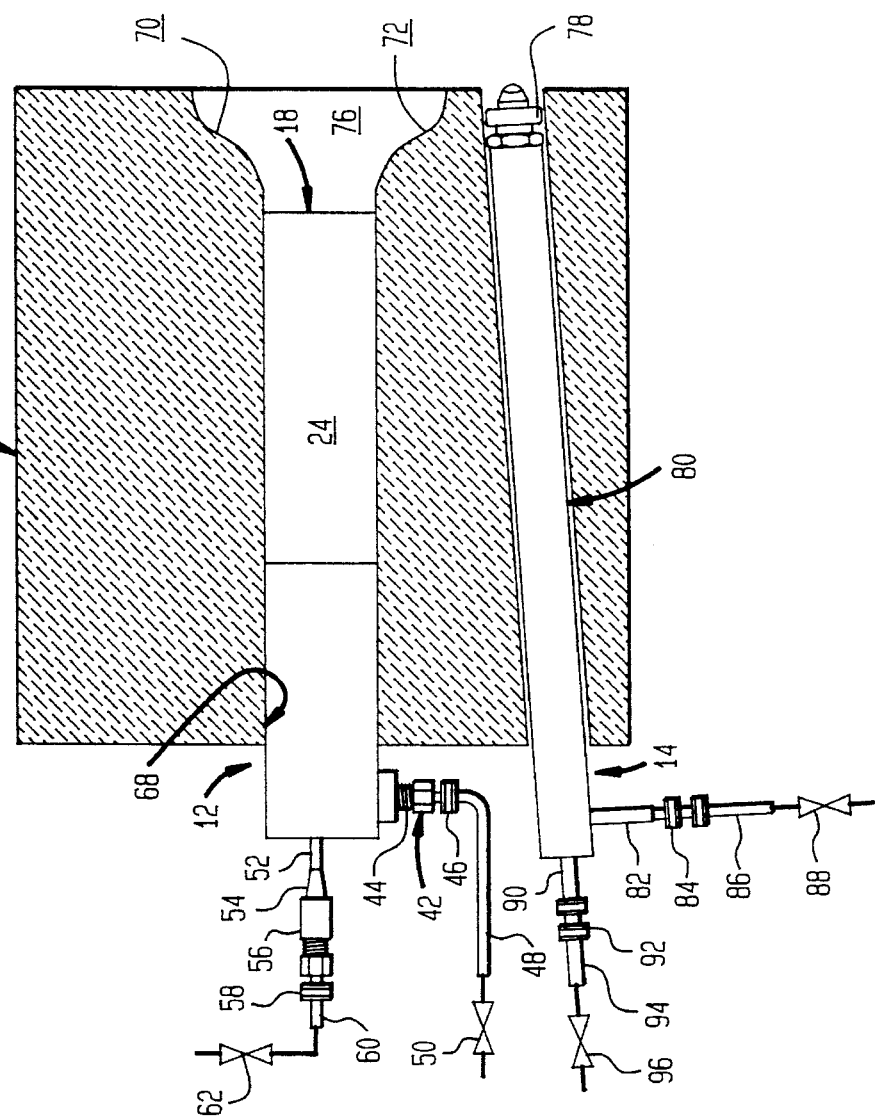
FIG. 1 is an elevational view of an oxy-fuel burner system in accordance with the present invention.

With reference to FIGS. 1 and 2 an oxy-fuel burner system 10 in accordance with the present invention is illustrated. Oxy-fuel burner system 10 comprises an oxy-fuel burner 12 designed to burn a primary or main gaseous fuel such as methane in an oxidant of oxygen or oxygen enriched air, and a atomizing fuel nozzle assembly 14 designed to burn an auxiliary liquid fuel. Oxy-fuel burner 12 and atomizing fuel nozzle assembly 14 are positioned within a burner block 16.

Oxy-fuel burner 12 (fully described in U.S. Pat. No. 5,299,129, which is hereby incorporated by reference) is provided with a body 18 of elongated configuration having top and bottom walls 20 and 22 and side walls 24 and 26. A central fuel nozzle 28 divides body portion 18 into upper and lower oxidant nozzles 30 and 32.

Central fuel nozzle 28 is supported within body portion 18 by upper and lower sets of vanes 34 and 36 which connect central fuel nozzle 28 to upper and lower walls 20 and 22. Upper and lower vanes 34 and 36 divide the upper and lower passageways forming upper and lower oxidant nozzles 30 and 32 in the lengthwise direction and therefore the flow of oxidant passing through upper and lower oxidant nozzles 30 and 32 into a plurality of subflows having velocities of equal magnitude and oriented so to gradually diverge in a traverse direction into the flow of oxidant. As a result, upper and lower oxidant jets emanating from upper and lower oxidant nozzles 30 and 32 have an outwardly divergent fan-shaped configuration. Central fuel nozzle 28 is provided with passageways in a transversely divergent pattern to the direction of fuel flow. This produces an outwardly divergent fan-shaped fuel jet which is sandwiched between the oxidant jets and that has a greater momentum and velocity than the upper and lower oxidant jets emanating from upper and lower oxidant nozzles 30 and 32. As a result, the fuel jet influences the upper and lower oxidant jets so that oxidant aspirates into the fuel.

A coupling assembly 42 is connected to the rear of body portion 18 to supply oxidant into body portion 18 and then into upper and lower oxidant nozzles 30 and 32. Coupling assembly 42 is connected to a threaded inlet 44 attached to body portion 18 and is designed to accept a conventional quick-disconnect fitting 46 attached to an oxidant line 48. Oxidant line 48 is attached to a valve 50 to either allow supply of the oxidant or to cut off the supply of oxidant to body portion 18.

A conduit of rectangular, traverse cross-section 52 supplies central fuel nozzle 28 with fuel. A transition piece 54, which transitions from the rectangular section of conduit 52 to a circular cross-section, allows attachment of a conventional coupling 56 designed to attach to a quick-disconnect fitting 58 which is in turn attached to a fuel line 60. Fuel line 60 can be supplied with methane and is provided with a valve 62, designed to cut off the flow of methane when such gaseous is fuel is not in use.

Oxy-fuel burner 12 is set within a passageway 68 of burner block 10. Surfaces 70, 72, 74 and 76 of burner block 16, located in front of burner 12 and forming the front of passage 68, are designed to allow the flame produced by burner 12 to gradually diverge.

Fuel nozzle assembly 14 is designed to produce a divergent, fan-shaped atomized spray of fuel. It consists of an atomizer nozzle 78 attached to an outer tube like jacket 80. An atomization gas inlet pipe 82 and a quick disconnect 84 for attachment of a compressed air or oxygen line 86 supply compressed air to help atomize the fuel. A valve 88 is provided to cut off the supply of atomization gas when liquid fuel is not in use. A coaxial tube 90, provided with a quick-disconnect fitting 92, attaches to atomization nozzle 78 and runs the length of tube 80. It supplies fuel oil to atomizing nozzle 78 through a fuel line 94 which is fitted with a valve 96 to cut off the supply of fuel when liquid fuel is again not in use. In the event high-pressure oil is available, atomizing nozzle 78 can be replaced by a pressure atomizing nozzle which does not require an atomizing medium.

Fuel nozzle assembly 14 is angled so that the resultant fan-shaped atomized spray of fuel is also angled into the oxidant. Even though the fuel and the oxidant will mix due to their momentum differential under normal operating circumstances, under turndown conditions of operation, there might not be enough fuel to influence the oxidant jet sufficiently. The angling of the fuel jet produces an intersection between the fuel and the oxidant jet to ensure mixing of the fuel and oxidant during turndown of the burner. As illustrated, oxy-fuel burner 12 and fuel nozzle assembly 14 are set within a burner block. Obviously, as illustrated, since the fuel nozzle undershoots the oxidant jet and the fuel has a higher momentum than the oxidant, the flame would tend to be deflected upwards, away from the melt. This would not be a preferred operation of the subject invention. In order to prevent this, the entire burner block can be canted downwardly, towards the melt so that under normal operating conditions, the flame is directed towards the melt. Alternatively, both oxy-fuel burner 12 and fuel nozzle assembly 14 can be canted downwardly towards the melt with there being an angling of fuel nozzle assembly 14 with respect to oxy-fuel burner 12 to ensure that the alternate fuel jet intersects the oxidant jet at an acute angle.

Figure 3:
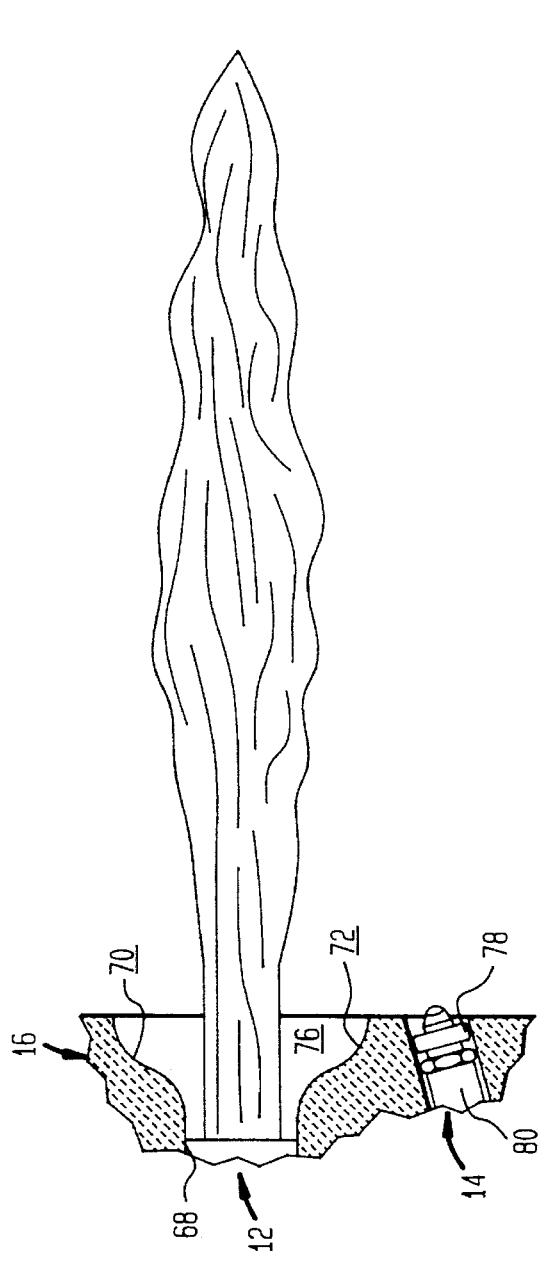
FIG. 3 is a fragmentary view of FIG. 1 illustrating operation of an oxy-fuel burner system of FIG. 1 utilizing a gaseous fuel.
Figure 4:
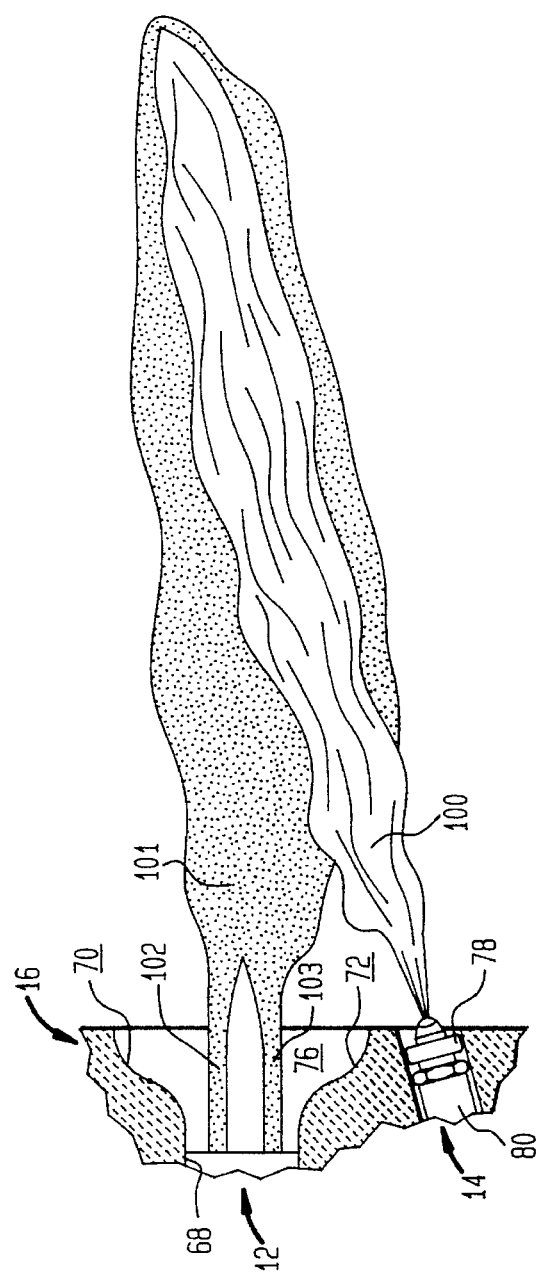
FIG. 4 is a fragmentary view of FIG. 1 illustrating operation of an oxy-fuel burner system in accordance with the present invention utilizing a liquid fuel.

With reference to FIG. 3, when gaseous fuel such as methane is to be used, subsidiary oxidant jets (See FIG. 4) emanating from burner 12 combine with a central gaseous fuel jet emanating from central fuel nozzle 28 to produce a combustible mixture which is burned. With reference to FIG. 4, during periods when gaseous fuel is not to be used, cutoff valve 62 cuts off the flow of the gaseous fuel and valves 88 and 96 are opened to supply oil and atomizing gas to produce an atomizing fuel spray. Fuel nozzle assembly 14 is located below burner 12 and is set at an angle so that a second fuel jet 100 intersects a combined oxidant jet 101 formed from subsidiary oxidant jets, which in the illustrated embodiment are subsidiary upper and lower oxidant jets 102 and 103, emanating from oxy-fuel burner 12. The angle of intersection is preferably less than 20° with 10° being a particularly preferred angle of intersection.

With reference to FIG. 5, second fuel jet 100 is outwardly divergent and fan-shaped in the same manner as subsidiary upper and lower oxidant jets 102 and 103. Second fuel jet 100 and combined oxidant jet 101 have closely matched shapes. The term "closely matched shapes" as used herein and in the claims means the liquid fuel and oxidant jets are suitable shaped so that either the fuel jet will have a smaller cross-section or about the same cross-section as the oxidant at the point the liquid fuel jet intersects the oxidant jet. This matching of shapes will ensure envelopment of the oxidant in the liquid fuel and thus, combustion of the fuel supported by the oxidant rather than oxygen present in the furnace environment. In this regard, in oxy-fuel burner 12, lower subsidiary oxidant jet 103 has a greater flow rate and momentum than upper subsidiary oxidant jet 102. As the fuel projects unburned fuel particles become increasingly more buoyant and thus cause the flame to lick-up. In order to counteract this typical behavior associated with projected combustion of fuels, upper subsidiary oxidant jet 102, flowing at a lower flow rate, supplies oxidant to burn such buoyant fuel particles. Therefore the fuel jet emanating from central fuel nozzle 28 has a closely matched shape with respect to lower subsidiary oxidant jet 102. In burners where the fuel jet is sandwiched by oxidant jets of equal mass flow rate, all jets will have closely matched shapes.

With reference to FIG. 6, oxy-fuel burner system 10 is illustrated within a furnace 104 utilizing the gaseous fuel and heating a melt 106. It is to be noted that flame 108 is oriented slightly towards melt 106. Under certain circumstances, there may not be enough distance between the melt and burner 18 to allow fuel burner assembly 14 to be positioned below burner 18. In such case, fuel nozzle assembly 14 can be positioned above burner 18 and inclined downwardly at the acute angle of less than 20°, preferably 10° to intersect the fuel jet. The illustrated, undershot configuration is desirable, however, because the flame positioning close to the thermal load is more easily controllable.

It should additionally be pointed out that the present invention has application to other oxy-fuel burning systems. For instance, in place of burner 18, the invention would also have applicability to an oxygen lance system in which an outwardly divergent, fan-shaped oxidant jet were positioned below an outwardly divergent, fan-shaped fuel jet issuing from a burner to attract the flame downwardly, near the thermal melt. Another example of a possible alternative embodiment would be to use an oxy-fuel burner in which the fuel jet were sandwiched between two high velocity oxidant jets to aspirate fuel into the oxidant. In addition, for furnaces run primarily on oil with a gaseous fuel such as propane or natural gas as secondary/backup fuel, oxy-fuel burner 12 can be run on liquid fuel as described in U.S. Pat. No. 5,299,929. The fuel nozzle assembly 14 can be used for the gaseous fuel when fuel types need to be switched. Also, valves 50, 62, 88 and 96 could be proportional valves. This would allow dual usage of fuel. For instance, if a low heating valve fuel such as propane were used in place of methane, then some of the liquid fuel could be burned along with the propane to increase the power output of burner system 10. In such case, valve 62 would be set in a partially open position to produce a reduced flow of propane through oxy-fuel burner 12. In such case, valves 50, 88 and 96 would be set in fully open positions. A combined oxidant jet 101 would be formed because very little combustion would occur within upper and lower subsidiary oxidant jets 102 and 103.

Although, the present invention has been described with reference to a preferred embodiment, it will be understood by those skilled in the art that numerous additions, changes and omissions may be made without departing from the spirit and scope of the present invention.

I claim:

1. An oxy-fuel burner system for alternatively or simultaneously burning gaseous and liquid fuels, said oxy-fuel burner system comprising:

an oxy-fuel burner including an actuable, first fuel nozzle means for producing a first fuel jet composed of a main fuel and oxidant nozzle means for producing at least one oxidant jet composed of an oxidant to support combustion of the main fuel of said first fuel jet; and actuable auxiliary, second fuel nozzle means for producing a second fuel jet composed of an auxiliary fuel to burn within said oxidant;

said main and said auxiliary fuels respectively composed of said gaseous and liquid fuels or vice-versa;

said oxy-fuel burner and said actuable auxiliary, second fuel nozzle means configured such that, under normal operating conditions, said first and second fuel jets each have a momentum different than that of said at least one oxidant jet to cause mixing of said main and auxiliary fuels with said oxidant.

2. The oxy-fuel burner system of claim 1, wherein each of said first and second fuel jets and said at least one oxidant jet has an outwardly divergent, fan-shaped configuration.

3. The oxy-fuel burner system of claim 1, wherein said main fuel comprises the gaseous fuel and said auxiliary fuel comprises said liquid fuel.

4. The oxy-fuel burner system of claim 1, wherein said first and second fuel jets and said at least one oxidant jets have closely matched shapes to cause said at least one oxidant jet to envelop said first or second fuel jets.

5. The oxy-fuel burner system of claim 1, wherein the momentum of said first and second fuel jets is greater than that of said at least one oxidant jet.

6. The oxy-fuel burner system of claim 1, wherein said second fuel jet means is angled with respect to said at least one oxidant jet so that said second fuel jet intersects said at least one oxidant jet at an acute angle to ensure mixing of said auxiliary fuel and said oxidant under turn-down operating conditions.

7. An oxy-fuel burner system for alternatively or simultaneously burning gaseous and liquid fuels, said oxy-fuel burner system comprising:

an oxy-fuel burner including an actuable, first fuel nozzle means for producing a first fuel jet composed of a main fuel and oxidant nozzle means for producing two subsidiary oxidant jets composed of an oxidant, sandwiching said first fuel jet when said first fuel nozzle means is actuated to produce a flow of said main fuel and merging into a combined oxidant jet when said first fuel nozzle means is actuated to at least reduce said flow of said main fuel; and actuable auxiliary, second fuel nozzle means for producing a second fuel jet composed of an auxiliary fuel to burn within said oxidant;

said main and said auxiliary fuels respectively composed of said gaseous and liquid fuels or vice-versa;

said oxy-fuel burner and said actuable auxiliary, second fuel nozzle means configured such that, under normal operating conditions, said first and second fuel jets each have a momentum, in case of said first fuel jet, different than that of at least one of said two subsidiary oxidant jets and, in case of said second fuel jet, different than that of said combined oxidant jet, to cause mixing of said main and auxiliary fuels with said oxidant.

8. The oxy-fuel burner system of claim 7, wherein:

said oxy-fuel burner is oriented such that said two subsidiary oxidant jets are located above and below said first fuel jet;

said gaseous fuel burns within said oxidant to produce a projected flame having a length and producing increasingly more buoyant fuel particles along said length of said projected flame; and said oxidant nozzle means is configured such that said subsidiary oxidant jet, located above said first fuel jet, has a lower mass flow rate than said subsidiary oxidant jet, located below said first fuel jet, to ensure combustion of said increasingly more buoyant fuel particles.

9. The oxy-fuel burner system of claim 7, wherein each of said first and second fuel jets, said two subsidiary oxidant jets and said combined oxidant jet have an outwardly divergent, fan-shaped configuration.

10. The oxy-fuel burner system of claim 7, wherein said main fuel comprises said gaseous fuel and said auxiliary fuel comprises said liquid fuel.

11. The oxy-fuel burner system of claim 7, wherein said first fuel jet and said at least one of said two subsidiary oxidant jets and said second fuel jet and said combined oxidant jet having closely matched shapes to cause said at least one of the two subsidiary oxidant jets to envelop said first fuel jet and said combined oxidant jet to envelop said second fuel jet.

12. The oxy-fuel burner system of claim 7, wherein the momentum of said first and second fuel jets is greater than said at least one subsidiary oxidant jet and said combined fuel jet, respectively.

13. The oxy-fuel burner system of claim 7, wherein said actuable auxiliary, second fuel nozzle means is angled such that said second fuel jet intersects said combined oxidant jet at an acute angle to ensure mixing of said auxiliary fuel and said oxidant under turn-down operating conditions.

14. The oxy-fuel burner system of claim 6 or claim 13 wherein said acute angle is no greater than about 20 degrees.

15. The oxy-fuel burner system of claim 14, wherein said acute angle is no greater than about 10 degrees.

16. The oxy-fuel burner system of claim 14, wherein said second fuel nozzle means is positioned below said oxidant nozzle means so as to be angled upwardly into said oxidant.

* * * * *